(12) United States Patent
Ng et al.

(10) Patent No.: US 7,180,430 B2
(45) Date of Patent: Feb. 20, 2007

(54) LOW-COST ABSOLUTE LINEAR OPTICAL ENCODER

(75) Inventors: Kean Foong Ng, Penang (MY); Hock Aun Tan, Kedah (MY); Moon Leong Low, Sri Nibong (MY); Yee Loong Chin, Parak (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 94 days.

(21) Appl. No.: 10/979,280

(22) Filed: Nov. 1, 2004

(65) Prior Publication Data
US 2006/0092047 A1    May 4, 2006

(51) Int. Cl.
*H03M 1/22* (2006.01)
*G01D 5/34* (2006.01)

(52) U.S. Cl. .................. 341/13; 250/231.16; 341/7

(58) Field of Classification Search .............. 341/7, 341/11, 13; 250/231.16, 231.17, 231.18
See application file for complete search history.

(56) References Cited

U.S. PATENT DOCUMENTS

| | | | | |
|---|---|---|---|---|
| 4,621,256 A | * | 11/1986 | Rusk | 341/13 |
| 5,068,529 A | * | 11/1991 | Ohno et al. | 250/231.18 |
| 5,563,408 A | * | 10/1996 | Matsumoto et al. | 250/231.14 |
| 2005/0156104 A1 | * | 7/2005 | Chong et al. | 250/231.13 |

* cited by examiner

*Primary Examiner*—Howard L. Williams

(57) ABSTRACT

A Low-Cost Absolute Linear Optical Encoder ("LALOE") for determining the absolute position of a read-head within the LALOE relative to a codestrip is disclosed. The LALOE may include an emitter module within the read-head, the emitter module having a plurality of light sources arranged in an light source pattern and a 90° Out-Of-Phase light source; and a detector module within the read-head, the detector module having a plurality of photo-detectors arranged in a photo-detector pattern corresponding to the light source pattern and a 90° Out-Of-Phase photo-detector corresponding to the 90° Out-Of-Phase light source.

21 Claims, 16 Drawing Sheets

| Positional Sub-pattern Block No. | 1 | 2 | 3 | 4 | 5 | 6 | 7 | 8 | 9 | 10 | | |
|---|---|---|---|---|---|---|---|---|---|---|---|---|
| Corresponding physical location of the Dark and Clear Elements of the Positional Sub-patterns on the Codestrip | 0 | 0 | 0 | 1 | 1 | 1 | 1 | 1 | 1 | 1 | 1 | 1 |
| | 0 | 0 | 0 | 0 | 0 | 0 | 0 | 0 | 0 | 1 | 1 | 1 |
| Corresponding Binary Value | 00000000 | 00000001 | 00000011 | 00000111 | 00001111 | 00011111 | 00111111 | 00111111 | 01111111 | 11111111 | | |
| Assigned Value | 64 | 192 | 320 | 448 | 576 | 704 | 832 | 960 | 1088 | 1216 | | |

FIG. 12

LOW-COST ABSOLUTE LINEAR OPTICAL ENCODER

BACKGROUND OF THE INVENTION

Sensors are key feedback devices on many electromechanical systems. There is a wide variety of sensors available and new sensor technologies are continuously being developed. One of the most common position sensors utilized to measure the moving parts within a mechanical system is the optical encoder. An optical encoder is a feedback device that converts motion or positional information into digital signals. Optical encoders produce a digital output based on an encoded media that passes either through or by the optical encoder. In general, the media is encoded with alternating light and dark regions (or slots) on the surface of the media.

The light and dark regions may contain opaque and transparent segments, respectively, that interrupt a light beam between a light source and a detector in the optical detector. The optical encoder output is then either a binary "ON" or "OFF," depending on whether the optical encoder is over a light or dark region on the media. The electronic signals generated by the optical encoder are then passed to a controller that is capable of determining the position and velocity of the detector based upon the received signals.

In FIG. 1, a side cross-sectional view of a typical transmissive optical encoder 100 in combination with a media codestrip 102 is shown. The optical encoder 100 may include a read-head 104, where the read-head 104 may include an emitter module 106, and a detector module 108. The read-head 104 and the codestrip 102 may move freely relative to each other in either a linear or rotational manner.

Both the emitter module 106 and detector module 108 may include optics capable of emitting and detecting optical radiation 110 from the emitter module 106 to the detector module 108. The optical radiation 110 may be visible, infrared, and/or ultraviolet light radiation. The emitter module 106 may include a light source (not shown) such as a light emitting diode ("LED") and the detector module 108 may include an array of photo-detectors (not shown) such as photo-diodes.

Optical encoders 100 are either linear optical encoders or rotational optical encoders. Linear optical encoders may determine the velocity, acceleration and position of a read-head relative to a linear codestrip utilizing a linear scale, while rotational optical encoders may determine the tangential velocity, acceleration and angular position of a read-head relative to a circular codestrip utilizing a circular scale. However, in general there are two types of optical encoders for both linear optical encoders and rotational optical encoders.

These two types of optical encoders are known as absolute optical encoders and relative (also known as "incremental") optical encoders. Absolute optical encoders utilize several sensors in parallel to produce bit patterns that determine the position of the read-head 104 along with its velocity and acceleration relative to the codestrip 102. Incremental optical encoders, however, only determine the velocity and acceleration of the read-head 104 but not its position relative to the codestrip 102. Incremental optical encoders are less expensive than absolute optical encoders.

In FIG. 2, a top-view of a typical transmissive linear media utilized as a codestrip 200 by an incremental linear optical encoder (not shown) is shown. The codestrip 200, FIG. 2, may include an alternating pattern of light bars 202 and dark bars 204. Utilizing the codestrip 200, the incremental linear optical encoder may determine the velocity and acceleration of the read-head (not shown) relative to the codestrip 200.

Unfortunately, incremental linear optical encoders utilizing the codestrip 200 are not capable of determining the position of a read-head relative to the codestrip 200. Absolute linear optical encoders have been utilized to solve this problem. In operation, known absolute linear optical encoders utilize multiple detectors and numerous segment patterns on the codestrip to produce different binary outputs for each segment pattern so that the detectors' positions are absolutely determined relative to the codestrip. However, known absolute linear optical encoders are significantly more expensive than incremental linear optical encoders because known absolute linear optical encoders utilize multiple detectors and numerous segment patterns on the codestrip. Therefore, there is a need for a cost effective absolute linear optical encoder capable of determining the detectors position relative to the codestrip without the cost associated with conventional absolute linear optical encoders.

SUMMARY

A Low-Cost Absolute Linear Optical Encoder ("LALOE") for determining the absolute position of a read-head within the LALOE relative to a codestrip is disclosed. The LALOE may include an emitter module within the read-head, the emitter module having a plurality of light sources arranged in an light source pattern and a 90° Out-Of-Phase light source; and a detector module within the read-head, the detector module having a plurality of photo-detectors arranged in a photo-detector pattern corresponding to the light source pattern and a 90° Out-Of-Phase photo-detector corresponding to the 90° Out-Of-Phase light source, wherein the detector module is configured to receive optical radiation from the emitter module.

In an example of operation, the LALOE may perform a process for determining the absolute position of the read-head relative to the codestrip. The process may include transmitting optical radiation from a plurality of light sources within an emitter module in the read-head to a detector module in the read-head through the codestrip, and receiving the transmitted optical radiation through the codestrip at a plurality of photo-detectors within the detector module, wherein the plurality of photo-detectors are arranged as a sub-plurality of photo-detectors corresponding to a photo-detector pattern and an intensity reference photo-detector. The process may also include determining the absolute position of the read-head.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 12 is a table summarizing the numerical representation of the ten example positional sub-patterns shown in FIGS. 9, 10 and 11 in accordance with the present invention.

DETAILED DESCRIPTION

In the following description, reference is made to the accompanying drawings that form a part hereof, and which show, by way of illustration, a specific embodiment in which the invention may be practiced. Other example of implementation may be utilized and structural changes may be made without departing from the scope of the present invention.

Figure 1:
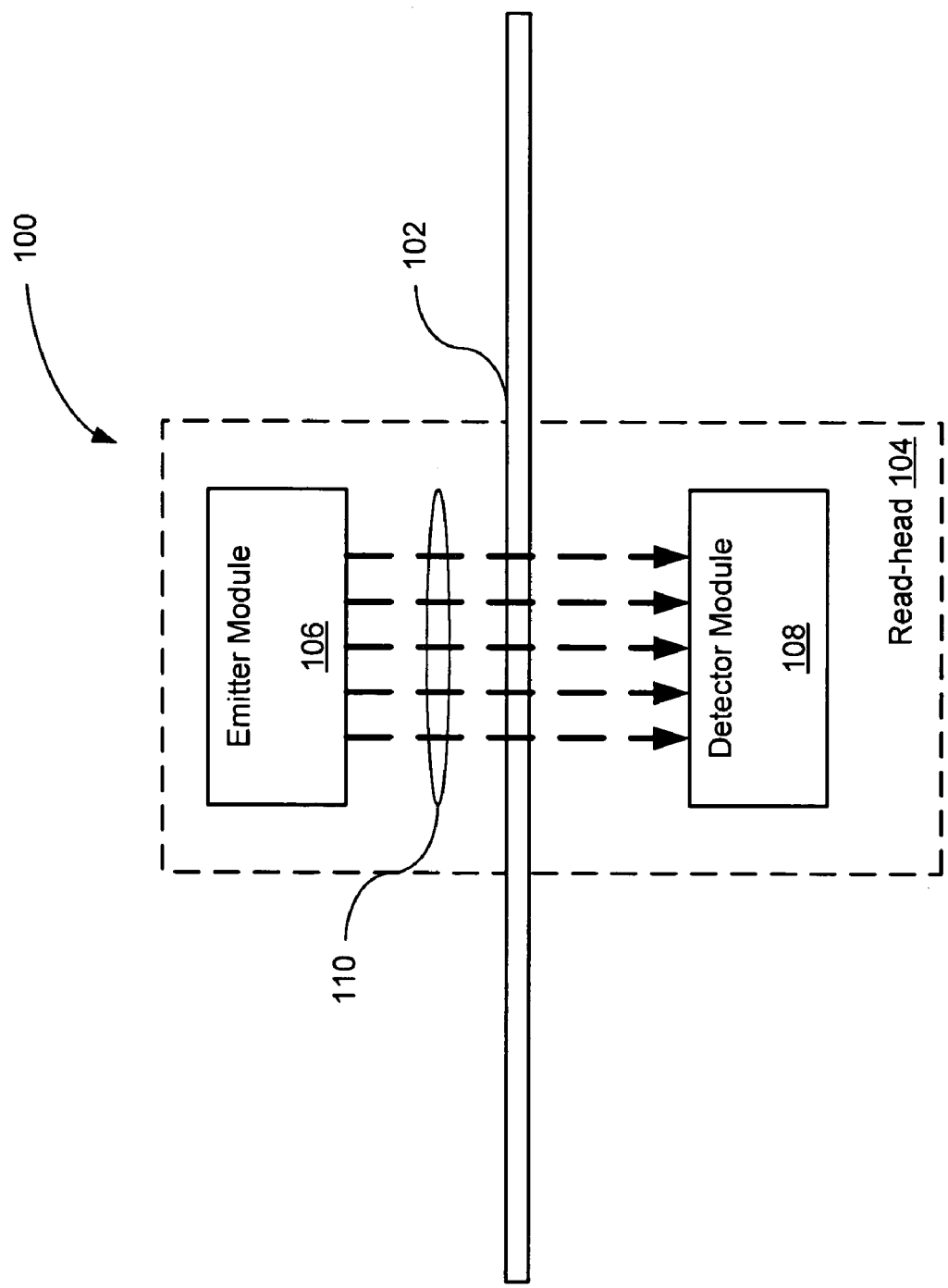
FIG. 1 is a side cross-sectional view of a typical known transmissive optical encoder in combination with a media codestrip.
Figure 2:
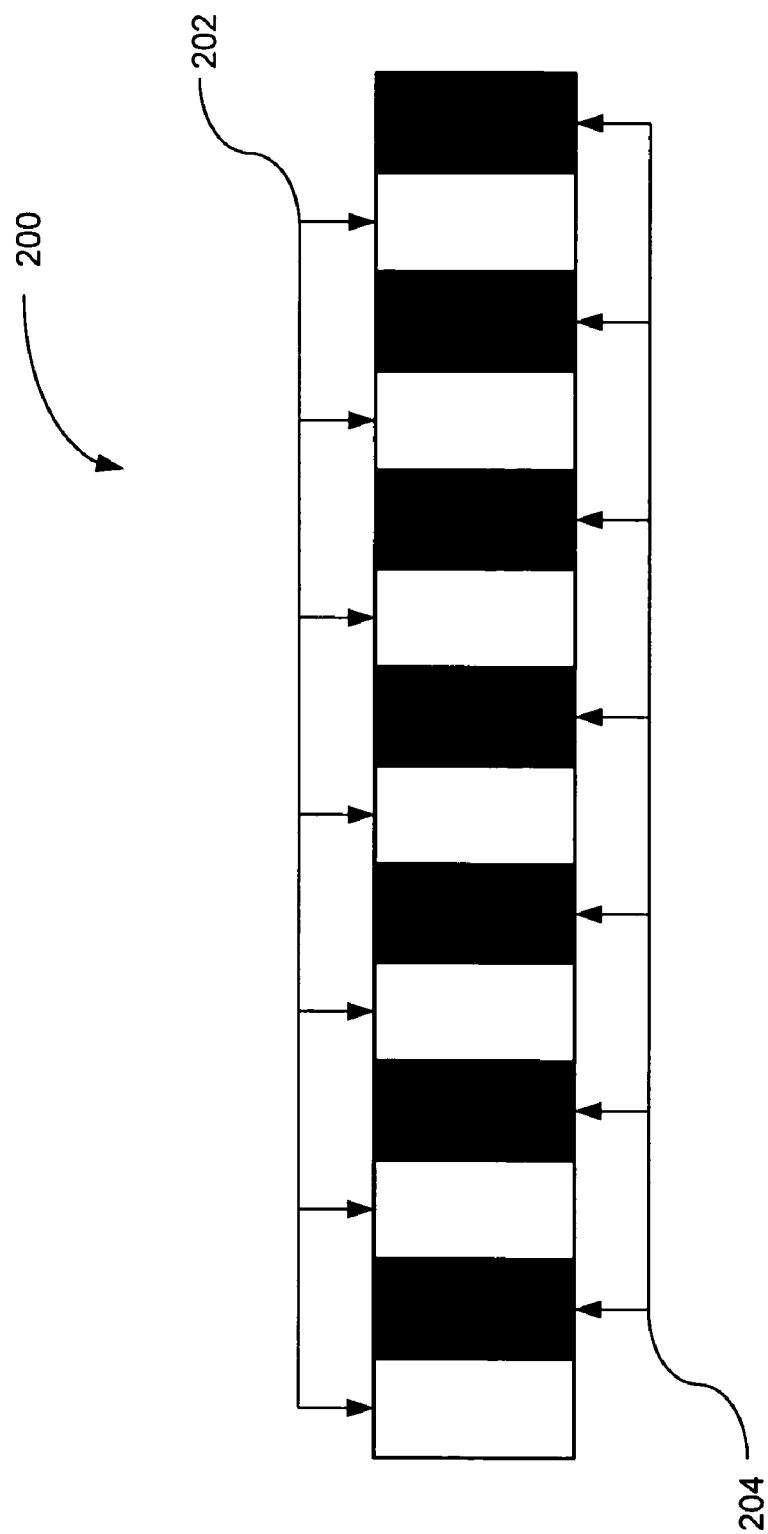
FIG. 2 is a top-view of a typical known transmissive linear media utilized as a codestrip by an incremental linear optical encoder.
Figure 3:
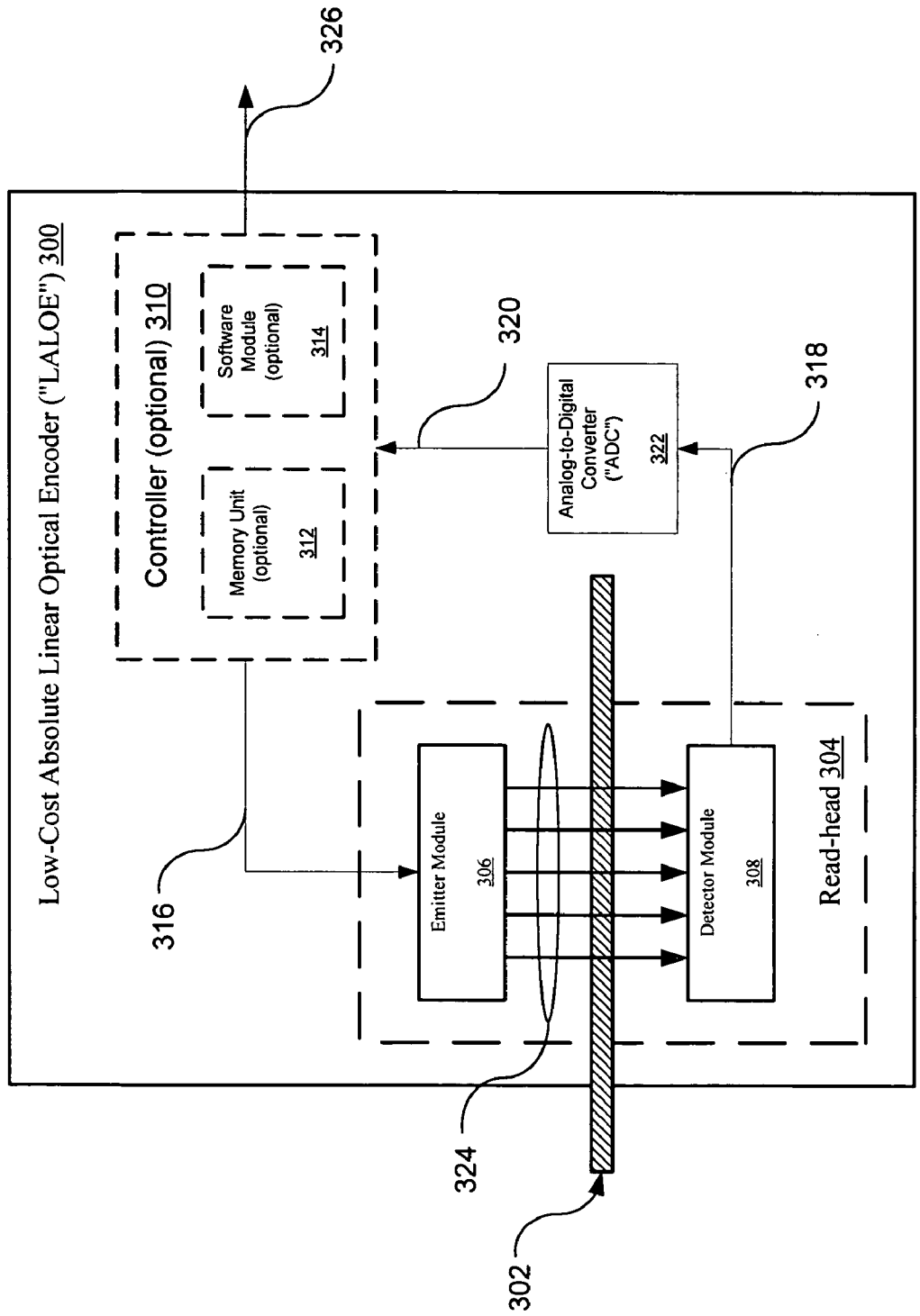
FIG. 3 is a block diagram of an example of an implementation of a Low-Cost Absolute Linear Optical Encoder ("LALOE") with a codestrip in accordance with the present invention.

In FIG. 3, a block diagram of an example of an implementation of a Low-Cost Absolute Linear Optical Encoder ("LALOE") 300 is shown with a codestrip 302. The LALOE 300 may include a read-head 304. The read-head 304 may include an emitter module 306 and a detector module 308. The LALOE 300 may also include an optional controller 310. The optional controller 310 may include an optional memory module 312 and an optional software module 314. The optional controller 310 may be in signal communication with both the emitter module 306 and detector module 308 via signal paths 316, 318 and 320, respectively. The LALOE 300 may also include an analog-to-digital converter ("ADC" or "A/D") 322 in signal communication with the detector module 308 and optional controller 310, via signal paths 318 and 320, respectively.

The emitter module 306 may include at least one light source (not shown) and optics (not shown) capable of producing light radiation 324. As an example, the light source may include a light emitting diode ("LED") and the light radiation 324 may be visible, infrared or ultraviolet light. The codestrip 302 may be any media capable of allowing the light radiation 324 to pass transmissively through the codestrip 302 from the emitter module 306 to the detector module 308. The codestrip 302 may include opaque and transparent portions that both block and allow the light radiation 324 to pass through the codestrip 302. The detector module 308 may include at least one photo-detector (not shown) and optics (not shown) capable of detecting the light radiation 324 that is passed through the codestrip 302. As an example of an implementation, the photo-detector may include a photo-diode.

The ADC 322 may be any device capable of converting the received analog signals from the detector module 308 along signal path 318 into digital signals that are output along signal path 320. It is appreciated by those skilled in the art that ADCs are well known in the art and may be implemented utilizing numerous types of well known devices and/or software. The ADC 322 may be "N" length ADC, where N represents the bit resolution of the ADC (i.e., a 4-bit ADC, 6-bit ADC, 8-bit ADC, etc.). Additionally, the ADC 322 may be optionally either a separate module from the detector module 308 and optional controller 310 or it may be a part of the detector module 308, the read-head 304, or optional controller 310.

In an example of operation of the LALOE 300, the optional controller 310 may send control signals, via signal path 316, to the emitter module 306 to produce the light radiation 324. In response to receiving the light radiation 324 through the codestrip 302, the detector module 308 produces a response signal that is sent to the optional controller 310 via signal paths 318 and 320 through the ADC 322. The optional controller 310 then determines the position of the read-head 304 relative to the codestrip 302 and produces an output position signal 326.

In determining the position of the read-head 304 over the codestrip 302, the light radiation 324 interrupted by the codestrip 302 forms a unique pattern over the detector module 308. This unique pattern is translated by the detector module 308 and/or the optional controller 310 into a specific digital value corresponding to an absolute position of the read-head 304 over the codestrip 302. The digital value is then utilized to produce the output position signal 326.

The optional controller 310 may be any type of microcontroller capable of receiving the response signal from the detector module 308 and determining the position of the read-head 304 relative to the codestrip 302. The optional controller 310 may be a part of the LALOE 300 or it may be an external module in signal communication with the LALOE 300. Based on the complexity of the optional controller 310, the optional controller 310 may be a hardwired device or a programmable device capable of running programmed software from the software module 314 and storing data in the memory module 312.

Figure 4:
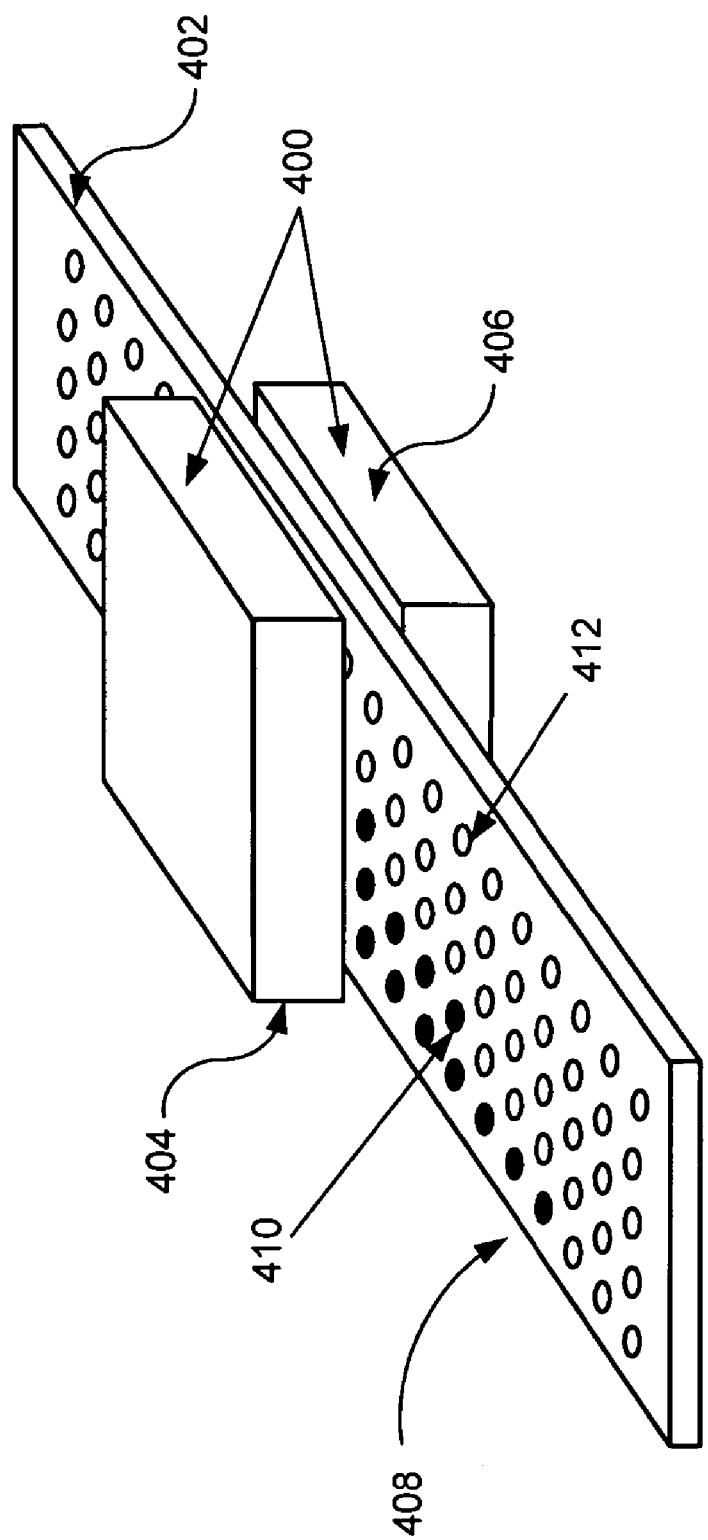
FIG. 4 is a perspective view of an example of an implementation of a read-head, shown in FIG. 3, relative to a codestrip in accordance with the present invention.

In FIG. 4, a perspective view of an example of an implementation of a read-head 400 relative to a codestrip 402 is shown. The read-head 400 includes the emitter module 404 and detector module 406. The codestrip 402 may include a positional pattern 408 of dark elements 410 and clear elements 412. The clear elements 412 may be transparent elements that allow the light radiation 320 to pass from the emitter module 306 to the detector module 308. The dark elements 410 may be opaque elements that do not allow the light radiation 320 to pass from the emitter module 306 to the detector module 308.

The detector module 406 may include an array of photo-detectors (not shown) capable of detecting the light radiation that is passed through the positional pattern 408 of the codestrip 402 to form a transmitted positional pattern (not shown) over the detector module 406.

Figure 5:
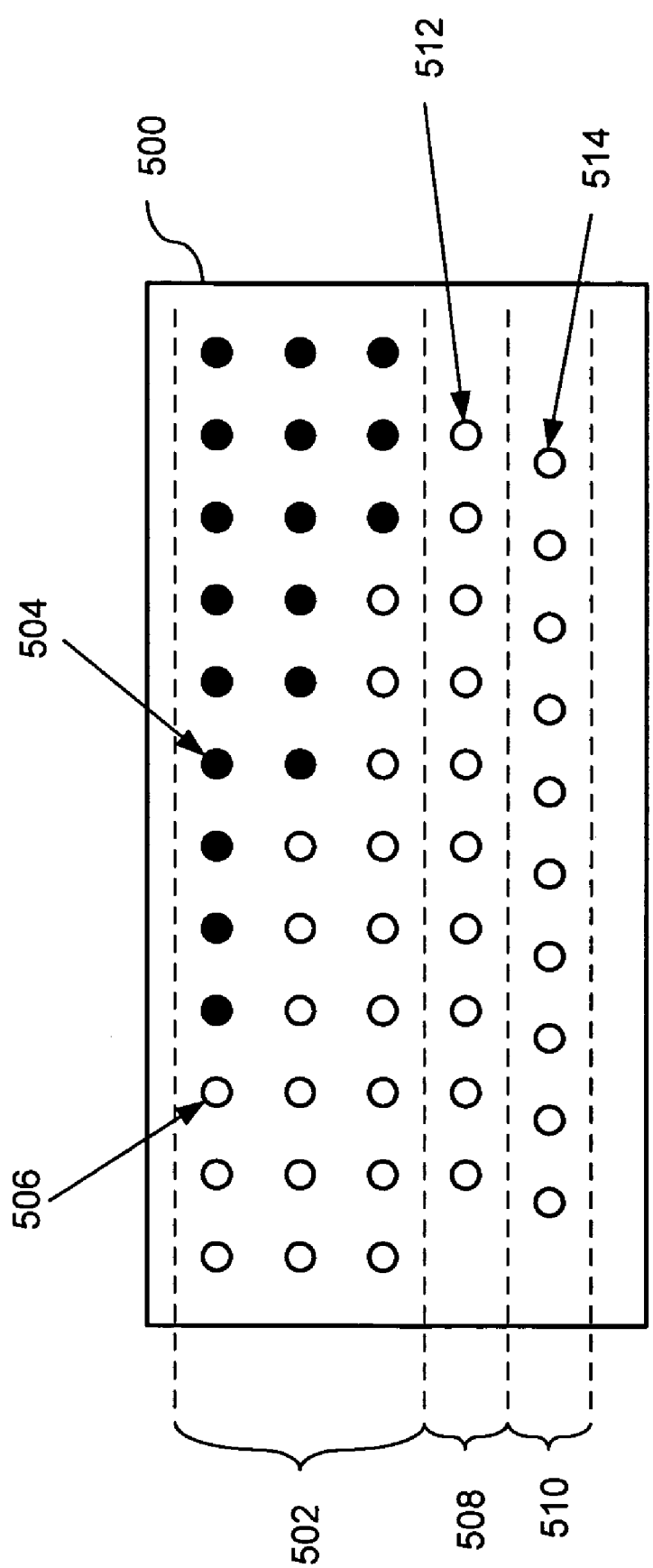
FIG. 5 is a top-view of an example of an implementation of the codestrip shown in FIG. 4 in accordance with the present invention.

In FIG. 5, a top-view of an example of an implementation of the codestrip 500 is shown. As an example, the codestrip 500 may include a positioning pattern 502 of dark elements 504 and clear elements 506. The codestrip 502 may also include an Intensity Reference Pattern 508 and a 90° Out-Of-Phase Pattern 510. The positional pattern 502 may include a plurality of positional sub-patterns (not shown) and the Intensity Reference Pattern 508 may include a plurality of clear reference elements 512. The 90° Out-Of-Phase Pattern 510 may also include a plurality of clear Out-Of-Phase elements 514.

In general, the positioning pattern 502 may be configured to provide the LALOE 300, FIG. 3, with a gross absolute position of the read-head 400, FIG. 4, relative to the codestrip 500, FIG. 5. This gross absolute position value may then be translated into a gross absolute position value of either a binary, decimal, hexadecimal or other type of numerical format corresponding to a positional sub-pattern of dark elements 504 and clear elements 506 within the positioning pattern 502.

The Intensity Reference pattern 508 may be configured to create a situation along the codestrip 500 where the intensity of light radiation (as converted to analog voltages by the photo-detectors in the detector module 406) is greatest at the midpoint of each of the positional sub-patterns and weakest at the edges of sub-positional patterns. This results in a symmetrical waveform (i.e., similar to a triangle and/or sine waveform) of light radiation (corresponding to the transmitted light radiation through each positional sub-pattern of the codestrip 500) being received at the detector module 406. Digitizing the received waveform of light radiation at the detector module 406 using conventional analog-to-digital conversion techniques with ADC 322, allows the LALOE 300 to interpolate the positional information of the read-head 400 relative to the codestrip 500 within each positional sub-pattern.

The 90° Out-Of-Phase Pattern may be configured to provide a means for the LALOE 300 to determine whether to add or subtract the positional information of the read-head 400 relative to the codestrip 500 from the gross absolute position value. Once the LALOE 300 determines whether to add or subtract the positional information of the read-head 400 relative to the codestrip 500 from the gross absolute position value, the LALOE 300 then determines the absolute position of the read-head 400 relative to the codestrip 500, which may be defined as the absolute position value.

Figure 6:
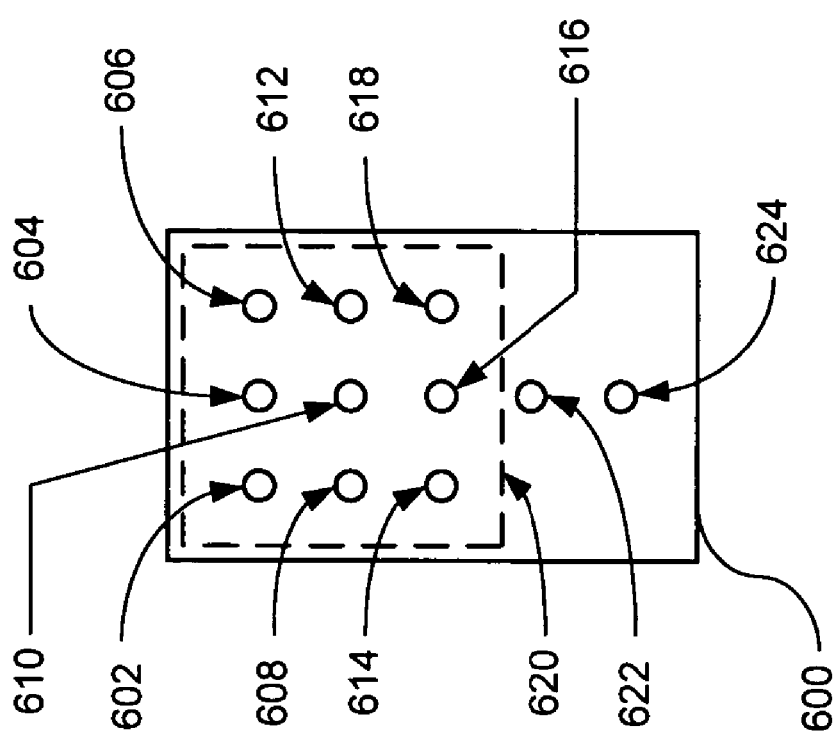
FIG. 6 is a top-view of an example of an implementation of the detector module shown in FIG. 4 in accordance with the present invention.

In FIG. 6, a top-view of an example of an implementation of detector module 600 is shown. The detector module 600 may include a plurality of photo-detectors and optics on the topside of the detector module 600. As an example, the detector module 600 may include photo-detectors 602, 604, 606, 608, 610, 612, 614, 616 and 618, which define a photo-detector pattern 620. Each photo-detector may be set to correspond to a representative binary number. As an example, photo-detector 602 may correspond to binary number $2^0$ (i.e., binary number "1" or base-10 number "1"), photo-detector 604 may correspond to binary number $2^1$ (i.e., binary number "10" or base-10 number "2"), photo-detector 606 may correspond to binary number $2^2$ (i.e., binary number "100" or base-10 number "4"), photo-detector 608 may correspond to binary number $2^3$ (i.e., binary number "1000" or base-10 number "8"), photo-detector 610 may correspond to binary number $2^4$ (i.e., binary number "10000" or base-10 number "16"), photo-detector 612 may correspond to binary number $2^5$ (i.e., binary number "100000" or base-10 number "32"), photo-detector 614 may correspond to binary number $2^6$ (i.e., binary number "1000000" or base-10 number "64"), photo-detector 616 may correspond to binary number $2^7$ (i.e., binary number "10000000" or base-10 number "128"), and photo-detector 618 may correspond to binary number $2^8$ (i.e., binary number "100000000" or base-10 number "256"). The detector module 600 may also include an Intensity Reference photo-detector 622 and a 90° Out-Of-Phase photo-detector 624.

Figure 7:
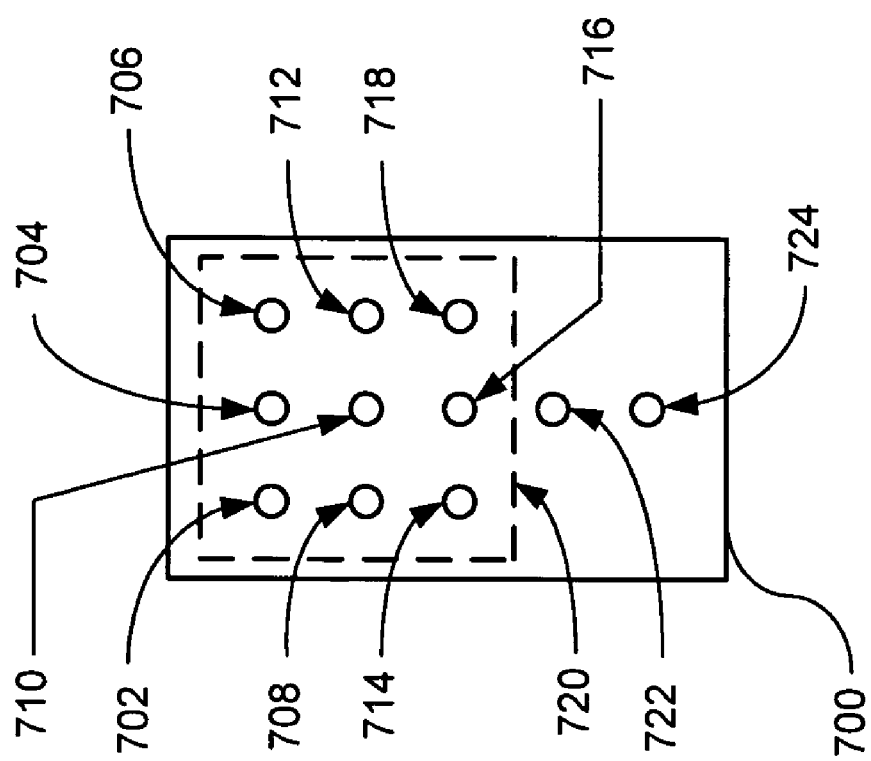
FIG. 7 is a bottom-view of an example of an implementation of the emitter module shown in FIG. 4 in accordance with the present invention.

Similarly, in FIG. 7, a bottom-view of an example of an implementation of emitter module 700 is shown. The emitter module 700 may include a plurality of light sources (such as LEDs) and optics on the bottom-side of the emitter module 700. As an example, the emitter module 700 may include light sources 702, 704, 706, 708, 710, 712, 714, 716 and 718, which define a light source pattern 720. Each light source may be set to correspond to a representative binary number. As an example, light source 702 may correspond to binary number $2^0$ (i.e., binary number "1" or base-10 number "1"), light source 704 may correspond to binary number $2^1$ (i.e., binary number "10" or base-10 number "2"), light source 706 may correspond to binary number $2^2$ (i.e., binary number "100" or base-10 number "4"), light source 708 may correspond to binary number $2^3$ (i.e., binary number "1000" or base-10 number "8"), light source 710 may correspond to binary number $2^4$ (i.e., binary number "10000" or base-10 number "16"), light source 712 may correspond to binary number $2^5$ (i.e., binary number "100000" or base-10 number "32"), light source 714 may correspond to binary number $2^6$ (i.e., binary number "1000000" or base-10 number "64"), light source 716 may correspond to binary number $2^7$ (i.e., binary number "10000000" or base-10 number "128"), and light source 718 may correspond to binary number $2^8$ (i.e., binary number "100000000" or base-10 number "256"). The emitter module 700 may also include an Intensity Reference light source 722 and a 90° Out-Of-Phase light source 724.

In this example of an implementation, the configuration of the photo-detectors in the photo-detector pattern 620 corresponds to the configuration of the light sources in the light source pattern 720. Therefore, the light radiation received at the detector module 600 corresponds to the light radiation transmitted by the emitter module 700 and passed through the positioning pattern 502 of the codestrip 500.

Figure 8:
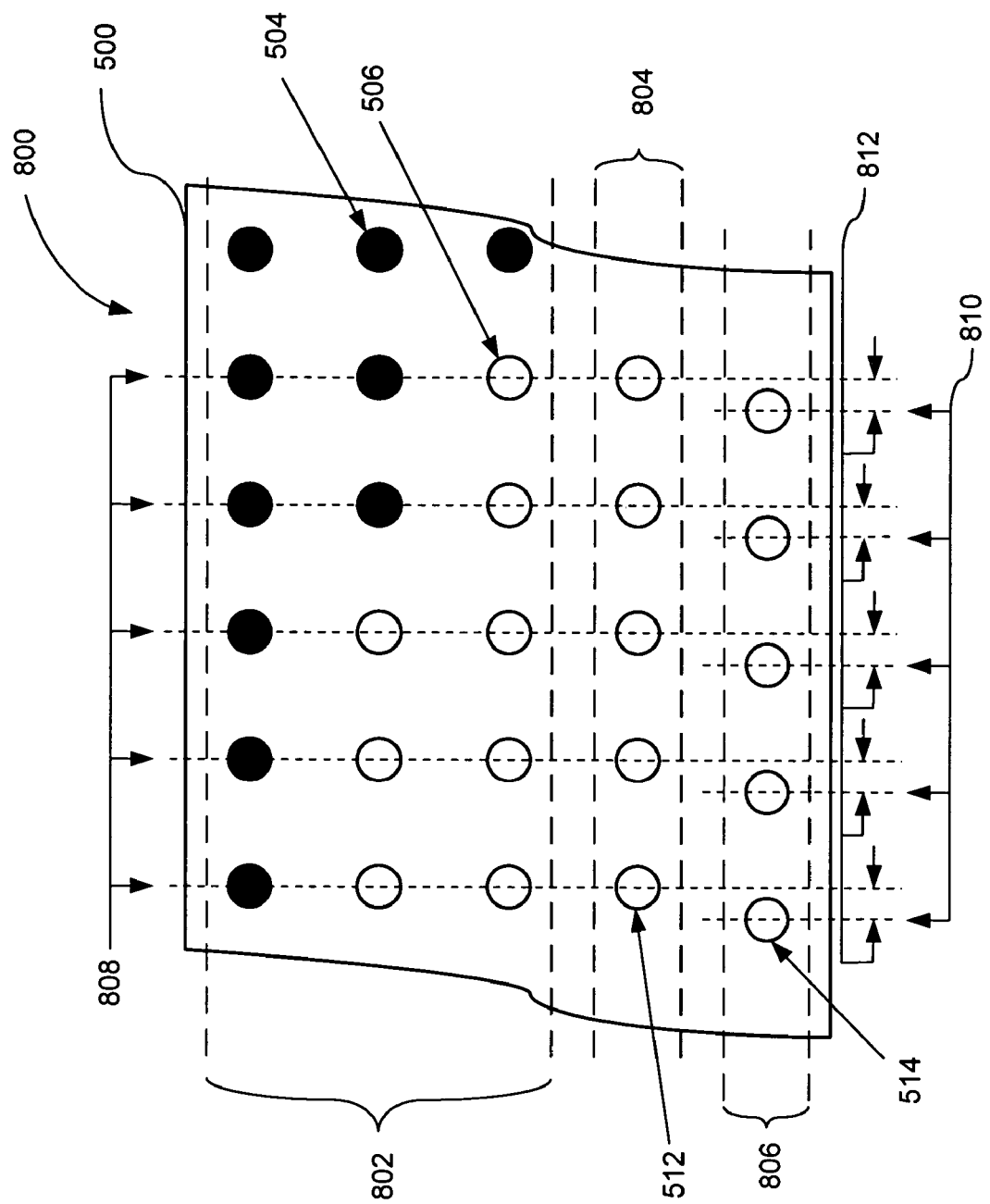
FIG. 8 is a partial top-view of the example of the implementation of the codestrip shown in FIG. 5 in accordance with the present invention.

In FIG. 8, a partial top-view 800 of the example of the implementation of the codestrip 500 is shown. The partial top-view 800 shows an example placement of the 90° Out-Of-Phase pattern 806 relative to the Intensity Reference pattern 804 and the positioning pattern 802. The individual centers of the dark elements 504 and clear elements 506 of the positioning pattern 802 and the individual centers of the clear reference elements 512 of the Intensity Reference pattern 804 may be aligned along a plurality of common reference axes 808. The individual center of the clear Out-Of-Phase elements 514 of the 90° Out-Of-Phase Pattern 806 may be aligned along a plurality of common Out-Of-Phase axes 810.

In order to achieve a 90° phase shift between the combination of the Intensity Reference pattern 804 and the positioning pattern 802, and the 90° Out-Of-Phase Pattern 806, the position of the clear Out-Of-Phase elements 514 relative to the clear reference elements 512 on the codestrip 500 may be placed such that the common reference axes 808 and the Out-Of-Phase axes 810 are spaced 812 a quarter wavelength apart.

Alternatively, it is appreciated by those of skill in the art that the 90° phase shift between the combination of the Intensity Reference pattern 804 and the positioning pattern 802, and the 90° Out-Of-Phase Pattern 806 may also be achieved by aligning the position of the clear 90° Out-Of-Phase elements 514 relative to the clear reference elements 512 on the codestrip 500 by aligning the common reference axes 808 and the Out-Of-Phase axes 810, while spacing the combination of the photo-detector pattern 620 and Intensity Reference photo-detector 622 a quarter wavelength apart from the 90° Out-Of-Phase photo-detector 624 on the detector module 600.

In an example of operation, LALOE 300 determines the position of the read-head 400 relative to the codestrip 500 by first determining the gross absolute position of the read-head 400, FIG. 4, relative to the codestrip 500, FIG. 5. The LALOE 300 then utilizes the received intensity of light radiation at the Intensity Reference photo-detector 622 and the received light radiation at the 90° Out-Of-Phase photo-detector 624 to interpolate the absolute position value corresponding to the absolute position of the read-head 400 relative to the codestrip 500. The gross absolute position of the read-head 400 relative to the codestrip 500 is determined by the positioning pattern 502, which may be configured into positional sub-pattern of dark elements 504 and clear elements 506 within the positioning pattern 502.

Figure 9:
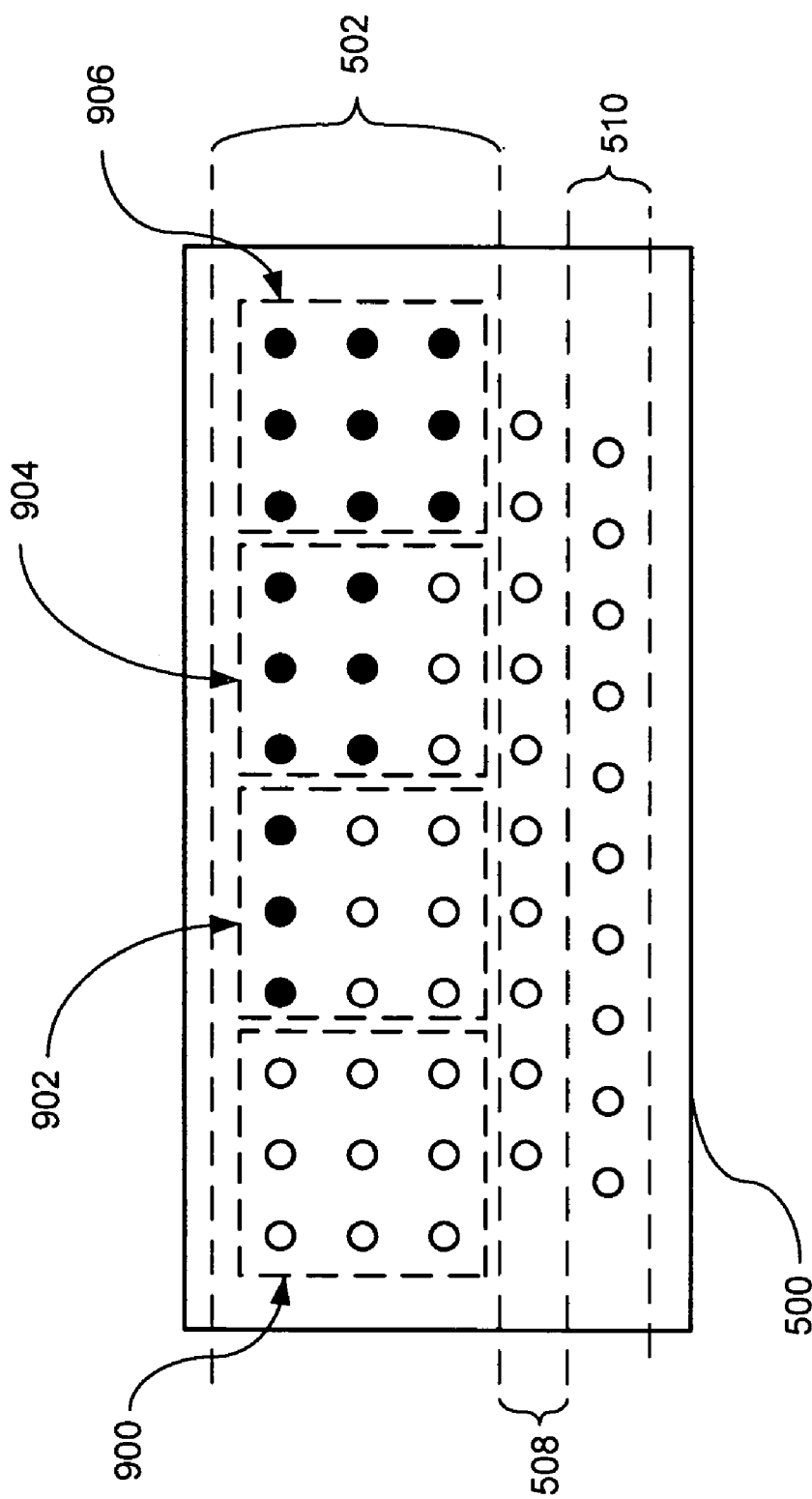
FIG. 9 is a top-view of an example of the implementation of the codestrip shown in FIG. 5 with four positional sub-patterns within the positioning pattern in accordance with the present invention.
Figure 10:
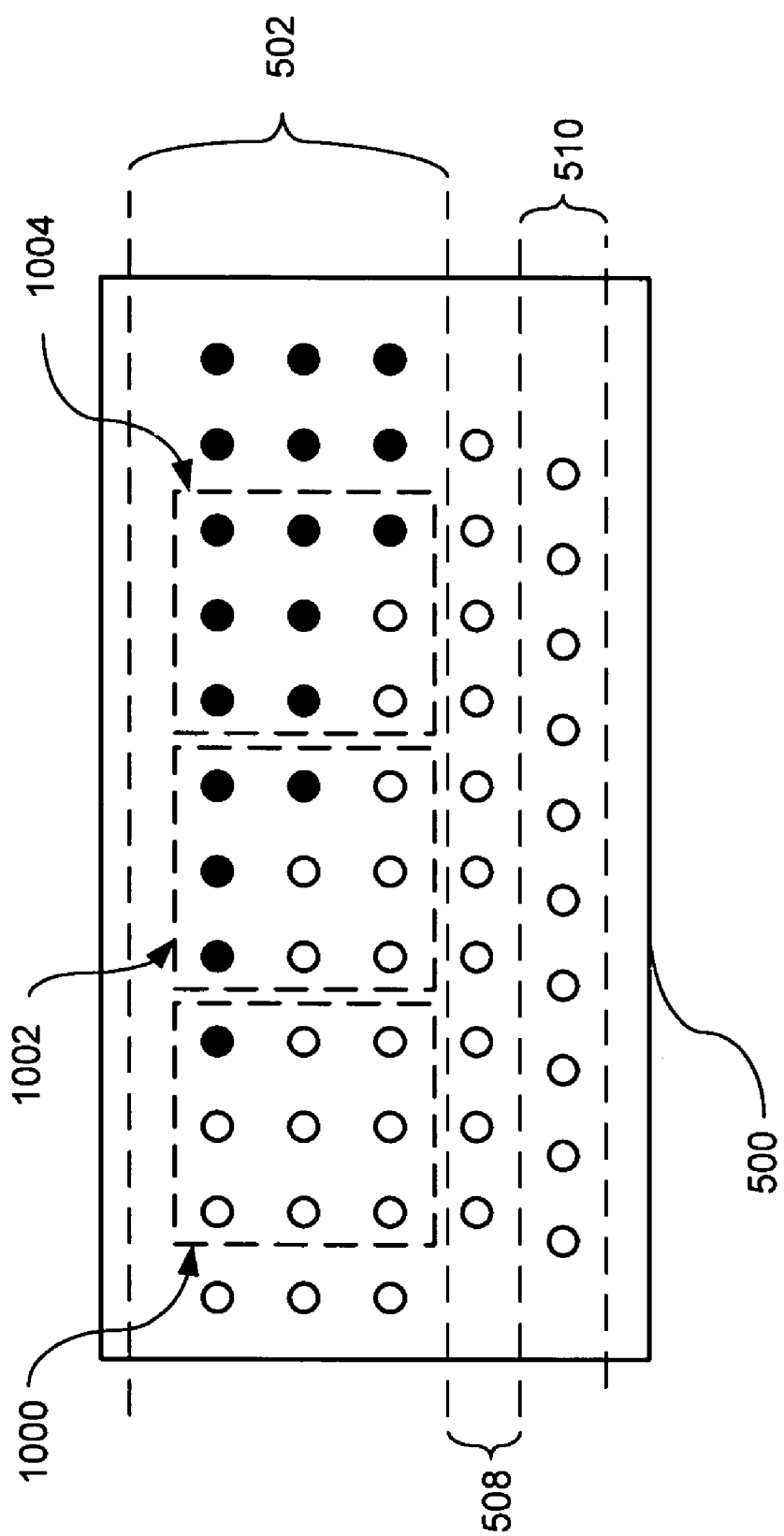
FIG. 10 is a top-view of an example of the implementation of the codestrip shown in FIG. 5 with three additional positional sub-patterns within the positioning pattern in accordance with the present invention.
Figure 11:
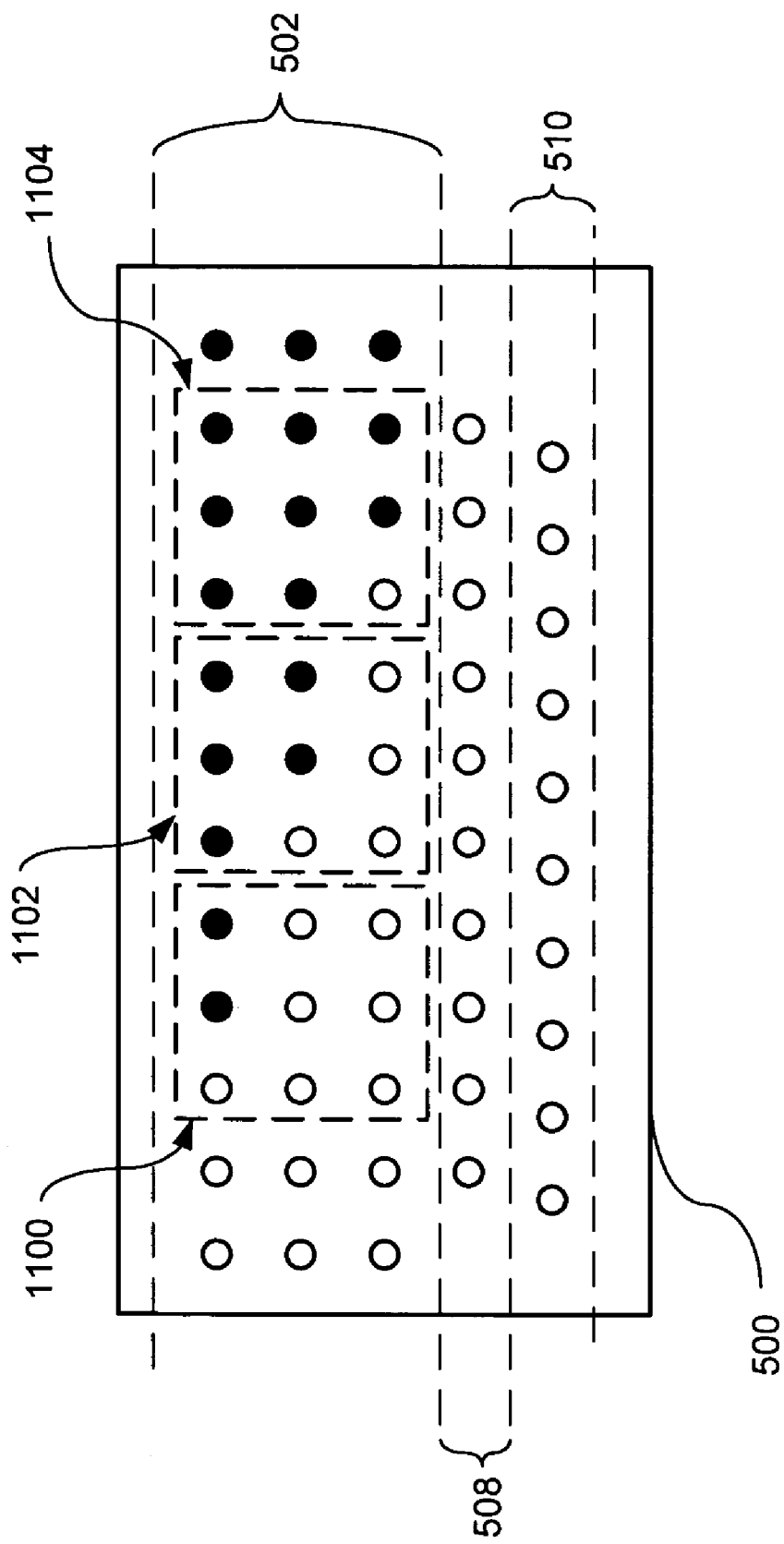
FIG. 11 is a top-view of an example of the implementation of the codestrip shown in FIG. 5 with another three additional positional sub-patterns within the positioning pattern in accordance with the present invention.

Each positional sub-pattern may be represented by a corresponding numerical value such as a binary code. As an example, ten positional sub-patterns are shown in FIGS. 9, 10 and 11. In these examples, each positional sub-pattern includes nine positional elements of either dark elements 504 or clear elements 506. Therefore, these examples allow for 512 (i.e., $2^9$) unique binary numbers that may be assigned to each positional sub-pattern.

In FIG. 9, a top-view of an example of the implementation of the codestrip 500 is shown with four positional sub-patterns 900, 902, 904 and 906 within the positioning pattern 502. Similarly, in FIG. 10, a top-view of an example of the implementation of the codestrip 500 is shown with three additional positional sub-patterns 1000, 1002, and 1004 within the positioning pattern 502. Additionally, in FIG. 11, a top-view of an example of the implementation of the codestrip 500 is shown with another three additional positional sub-patterns 1100, 1102, and 1104 within the positioning pattern 502.

The ten positional sub-patterns may be organized as positional sub-pattern block 1 900, positional sub-pattern block 2 1000, positional sub-pattern block 3 1100, positional sub-pattern block 4 902, positional sub-pattern block 5 1002, positional sub-pattern block 6 1102, positional sub-pattern block 7 904, positional sub-pattern block 8 1004, positional sub-pattern block 9 1104, and positional sub-pattern block 10 906. Based on the locations of dark elements 504 and clear elements 506 on the codestrip 500 within positional sub-patterns and the size (i.e., the resolution) of the ADC 322, the ten positional sub-patterns may be assigned the following binary location values: positional sub-pattern block 1 900 may be assigned the binary location value "000000000;" positional sub-pattern block 2 1000 may be assigned the binary location value "000000001;" positional sub-pattern block 3 1100 may be assigned the binary location value "000000011," positional sub-pattern block 4 902 may be assigned the binary location value "000000111;" positional sub-pattern block 5 1002 may be assigned the binary location value "000001111;" positional sub-pattern block 6 1102 may be assigned the binary value "000011111;" positional sub-pattern block 7 904 may be assigned the binary value "000111111;" positional sub-pattern block 8 1004 may be assigned the binary location value "001111111;" positional sub-pattern block 9 1104 may be assigned the binary location value "011111111;" and positional sub-pattern block 10 906 may be assigned the binary location value "111111111."

These binary location values may be converted to the following decimal assigned positional sub-pattern block values: positional sub-pattern block 1 900 may be assigned the binary location value "64;" positional sub-pattern block 2 1000 may be assigned the binary location value "192;" positional sub-pattern block 3 1100 may be assigned the binary location value "320;" positional sub-pattern block 4 902 may be assigned the binary location value "448;" positional sub-pattern block 5 1002 may be assigned the binary location value "576;" positional sub-pattern block 6 1102 may be assigned the binary value "704;" positional sub-pattern block 7 904 may be assigned the binary value "832;" positional sub-pattern block 8 1004 may be assigned the binary location value "960;" positional sub-pattern block 9 1104 may be assigned the binary location value "1088;" and positional sub-pattern block 10 906 may be assigned the binary location value "1216." FIG. 12 is a table summarizing the numerical representation of the ten example positional sub-pattern blocks shown in FIGS. 9, 10 and 11. In this example, the binary location values may be determined by a 6-bit ADC 322 with a corresponding interpolation resolution of 64 (i.e., $2^6$).

The Intensity Reference pattern 804 may be utilized to determine the position of each positional sub-pattern block on the codestrip 500 because the Intensity Reference pattern 804 and the positional sub-patterns are vertically aligned along the codestrip 500. Therefore, the sum of the light radiation transmitted from the emitter module 700 to the detector module 600 through each positional sub-pattern block on the codestrip 500 will result in a positional sub-pattern symmetrical waveform (i.e., similar to a triangle and/or sine waveform) that is aligned with the Intensity Reference symmetrical waveforms produced by the light radiation transmitted from the emitter module 700 to the detector module 600 through each individual Intensity Reference element of the Intensity Reference pattern 804 on the codestrip 500 as shown in FIG. 13.

Figure 13:
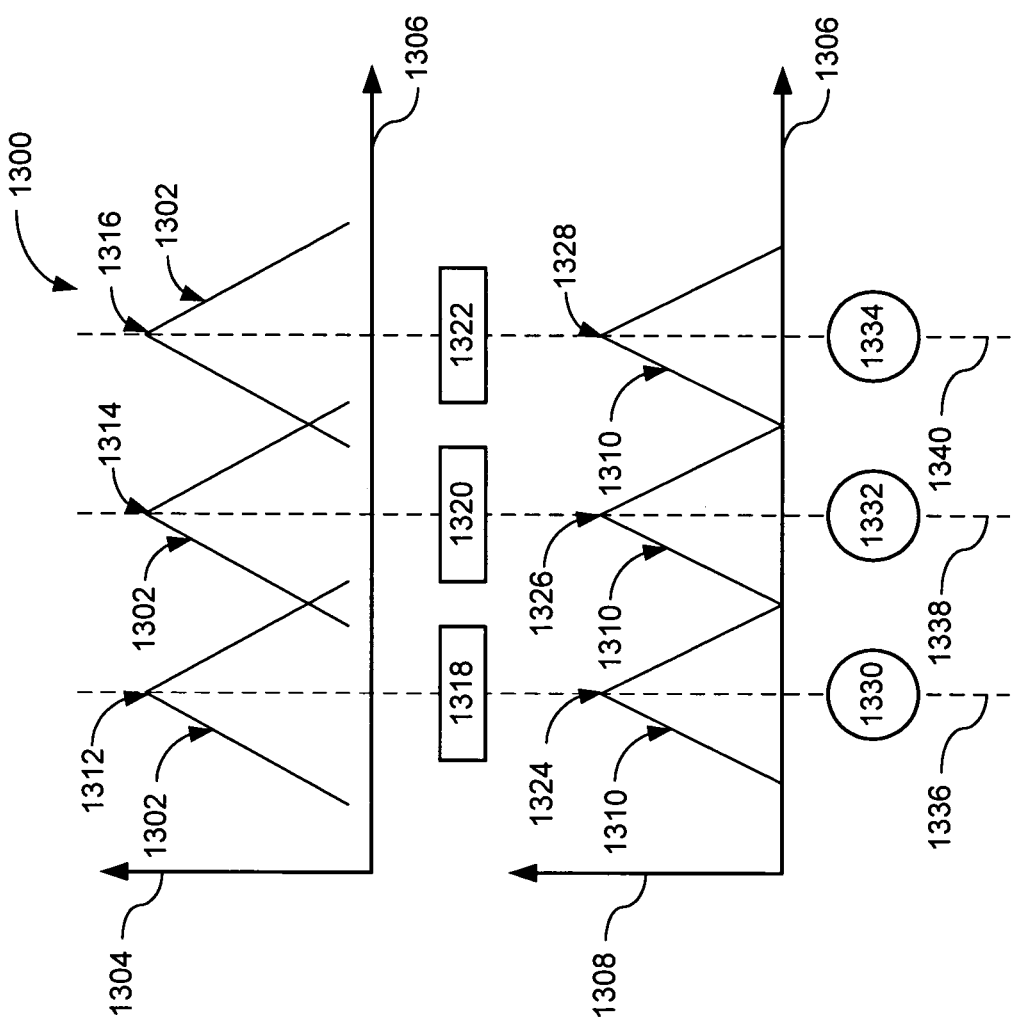
FIG. 13 is a graphical representation showing the sum of the light radiation transmitted from the emitter module to the detector module through each positional sub-pattern block on the codestrip as aligned with the Intensity Reference symmetrical waveforms produced by the light radiation transmitted from the emitter module to the detector module through each individual Intensity Reference element of the Intensity Reference pattern on the codestrip shown in FIG. 5, in accordance with the present invention.

In FIG. 13, a plot 1300 of the positional sub-pattern symmetrical waveforms 1302 of the sum of the light radiation 1304 transmitted from the emitter module 700 to the detector module 600 through each positional sub-pattern block on the codestrip 500 versus a scaled value 1306 of the codestrip 500 is shown. Similarly shown is another plot 1308 of the Intensity Reference symmetrical waveforms 13 10 produced by the light radiation transmitted from the emitter module 700 to the detector module 600 through each individual Intensity Reference element of the Intensity Reference pattern 804 on the codestrip 500 versus a scaled value 1306 of the codestrip 500. As an example, the intensity voltage values corresponding to the Intensity Reference symmetrical waveforms 1310 may vary between 0 and 5 volts. The voltage is dependent on a voltage reference to the ADC (not shown) and the intensity of the optical radiation incident on the detector module.

The peaks 1312, 1314 and 1316 of the positional sub-pattern symmetrical waveforms 1302 correspond to the center of each positional sub-pattern block 1318, 1320, and 1322 on the codestrip 500. As an example, positional sub-pattern block 1318 may correspond to positional sub-pattern block 2 1000 having an assigned binary location value of "000000001." Similarly, positional sub-pattern block 1320 may correspond to positional sub-pattern block 3 1100 having an assigned binary location value of "000000011." Additionally, positional sub-pattern block 1322 may correspond to positional sub-pattern block 4 902 having an assigned binary location value of "000000111." It is appreciated by those of skill in the art that while only three positional sub-pattern symmetrical waveforms are shown, any plurality of symmetrical waveforms may be shown without departing from the scope of the description.

Additionally, the peaks 1324, 1326 and 1328 of the Intensity Reference symmetrical waveforms 1310 correspond to the center of each individual Intensity Reference element of the Intensity Reference pattern 804 on the codestrip 500 that corresponds to each positional sub-pattern block. As an example, the Intensity Reference element 1330 may correspond to positional sub-pattern block 2 1000 having an assigned binary location value of "000000001." Similarly, the Intensity Reference element 1332 may correspond to positional sub-pattern block 3 1100 having an assigned binary location value of "000000011." Additionally, the Intensity Reference element 1334 may correspond to positional sub-pattern block 4 902 having an assigned binary location value of "000000111." Again, it is appreciated by those of skill in the art that while only three positional sub-pattern symmetrical waveforms are shown, any plurality of symmetrical waveforms may be shown without departing from the scope of the description. The peaks 1312, 1314 and 1316 of the positional sub-pattern symmetrical waveforms 1302 and the peaks 1324, 1326 and 1328 of the Intensity Reference symmetrical waveforms 1310 are aligned along the vertical axes 1336, 1338, 1340, respectively, on the codestrip 500.

Figure 14:
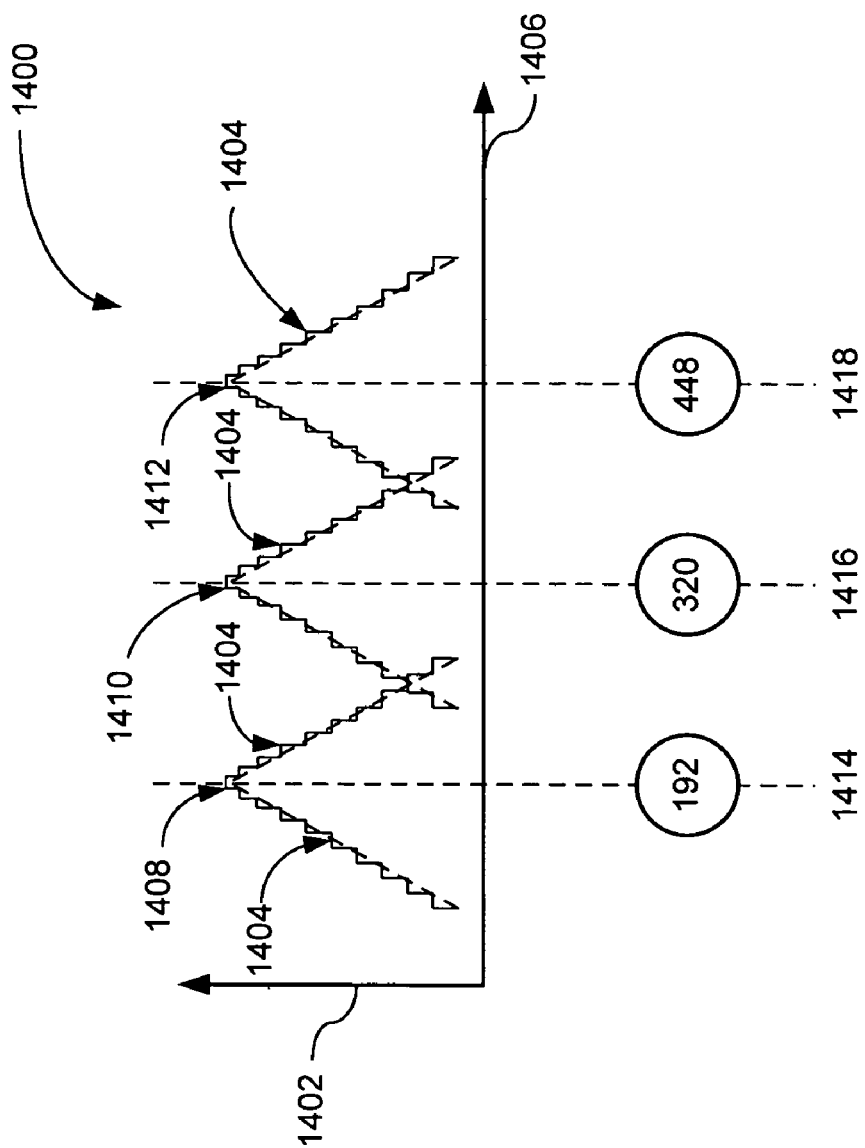
FIG. 14 is a plot of digitized Intensity Reference symmetrical waveforms versus the scaled value of the codestrip shown in FIG. 5, in accordance with the present invention.

In order to interpolate the absolute position value corresponding to the absolute position of the read-head 400 relative to the codestrip 500, the LALOE 300 digitizes the Intensity Reference symmetrical waveforms with the ADC 322 to create digitized Intensity Reference symmetrical waveforms as shown in FIG. 14. In FIG. 14, a plot 1400 of intensity 1402 of the digitized Intensity Reference symmetrical waveforms 1404 versus the scaled value 1406 of the codestrip 500 is shown.

If "X" is the digitizing factor, the digitized Intensity Reference symmetrical waveforms 1402 have a digital resolution of 2X because the digitized Intensity Reference symmetrical waveforms 1402 will include X discrete locations on each side of the peaks 1408, 1410, and 1412 as aligned to the vertical axes 1414, 1416, 1418. X, the digitizing factor, is typically determined by an ADC 322 utilized in the digitizing process. Therefore, as an example, a 6-bit ADC 322 would yield an X equal to 64 (i.e., $2^6$) resulting in 128 discrete locations (i.e., 2×64) within each positional sub-pattern. Once digitized, the LALOE 300 utilizes the digitized Intensity Reference symmetrical waveforms 1404 and the 90° Out-Of-Phase pattern 806 to interpolate the absolute position value corresponding to the absolute position of the read-head 400 relative to the codestrip 500.

Figure 15:
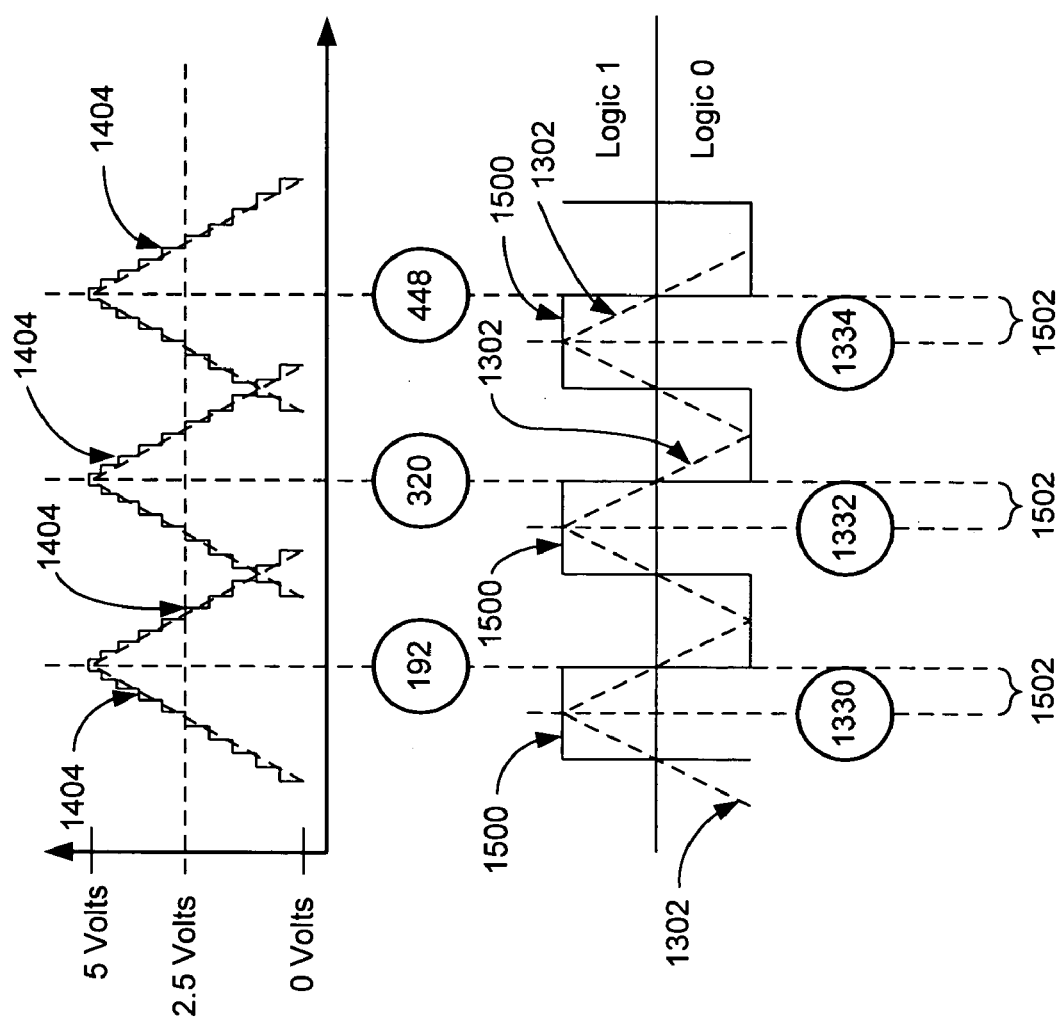
FIG. 15 is a plot of the positional sub-pattern symmetrical waveforms generated that are converted to square-wave waveforms 90° out-of-phase with the digitized Intensity Reference symmetrical waveforms shown in FIG. 14.

As shown in FIG. 15, utilizing the 90° Out-Of-Phase pattern 802, the positional sub-pattern symmetrical waveforms 1302 generated are converted to square-wave waveforms 1500 90° out-of-phase 1502 with the digitized Intensity Reference symmetrical waveforms 1404.

The square-wave waveforms 1500 operate as digital markers that are utilized by the controller to determine if a digitized discrete location is either added or subtracted from the gross absolute position of the read-head 400 relative to the codestrip 500 as determined initially by the positional sub-pattern symmetrical waveforms 1302.

As an example, any position which corresponds to a logical 0 of the square-wave 1500 will signify that the interpolated value is to be added to the gross absolute position. If a logical 1 was obtained, the interpolated value is to be subtracted from the gross absolute position. Hence, if the read-head 400 was positioned over the approximate location of $192_{10}$ and reading a voltage of 2.5V from the ADC and corresponding to a logical 0 from the square-wave 1500, the interpolation will yield an absolute location of $224_{10}$, obtained by adding 32 discrete locations to $192_{10}$.

Figure 16:
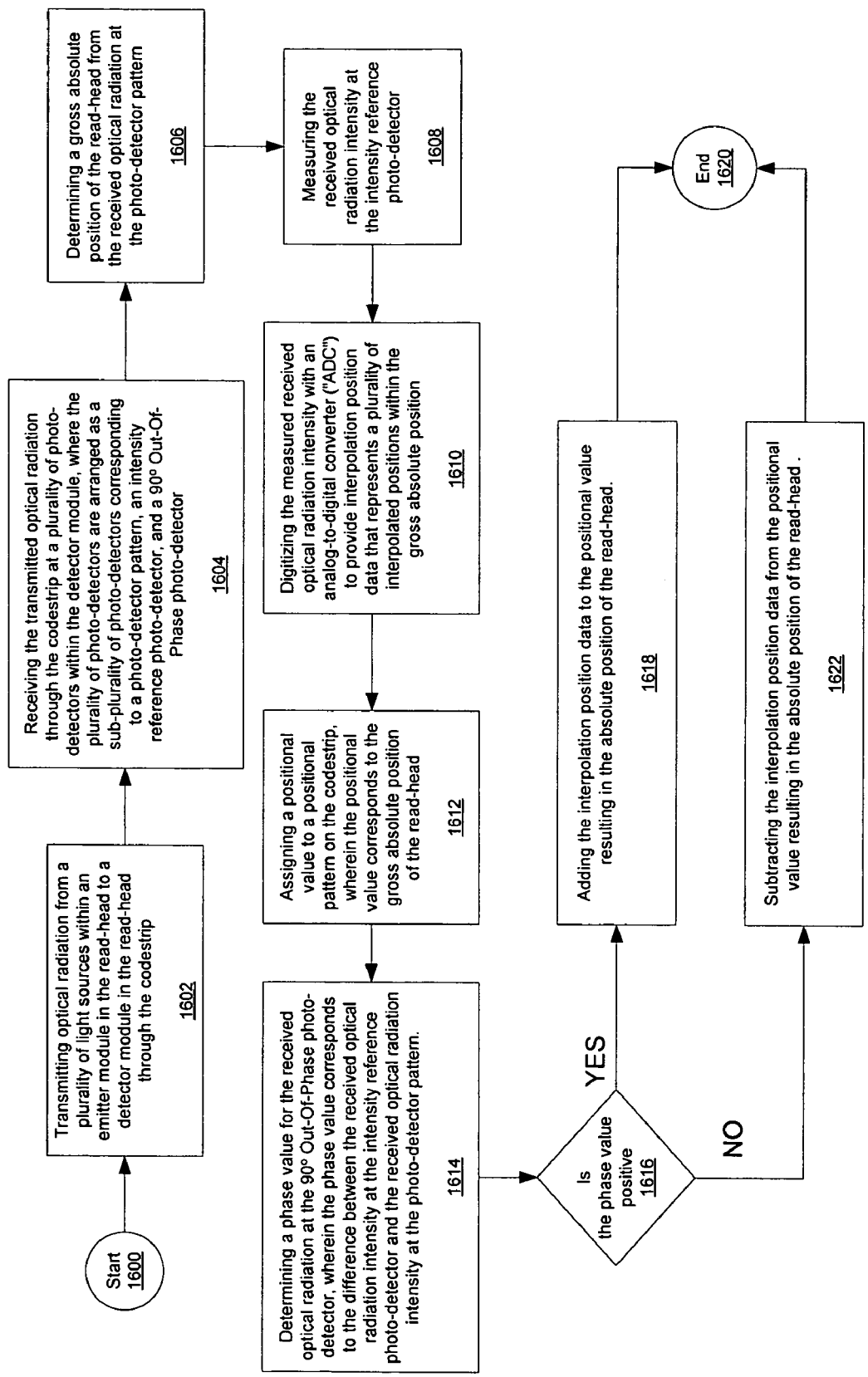
FIG. 16 is a flow chart showing an example process preformed by the LALOE shown in FIG. 3.

In FIG. 16, a flow chart showing an example process performed by the LALOE shown in FIG. 3 is shown. The process begins in step 1600 and in step 1602, a plurality of light sources within an emitter module in the read-head transmit optical radiation to a detector module in the read-head through the codestrip. In step 1604, a plurality of photo-detectors within the detector module receive the transmitted optical radiation through the codestrip. The plurality of photo-detectors are arranged as a sub-plurality of photo-detectors corresponding to a photo-detector pattern, an intensity reference photo-detector, and a 90° Out-Of-Phase photo-detector. In step 1606, the LALOE determines a gross absolute position of the read-head from the received optical radiation at the photo-detector pattern. In step 1608, the intensity reference photo-detector measures the received optical radiation intensity at the intensity reference photo-detector and in step 1610 an ADC digitizes the measured received optical radiation intensity to provide interpolation position data that represents a plurality of interpolated positions within the gross absolute position. Then in step 1612, the LALOE assigns a positional value to a positional pattern on the codestrip, where the positional value corresponds to the gross absolute position of the read-head. The LALOE then determines a phase value for the received optical radiation at the 90° Out-Of-Phase photo-detector, where the phase value corresponds to the difference between the received optical radiation intensity at the intensity reference photo-detector and the received optical radiation intensity at the photo-detector pattern in step 1614. The process then continues to decision step 1616. In decision step 1616, if the phase value is positive, the process continues to step 1618 and the LALOE adds the interpolation position data to the positional value, which results in the absolute position of the read-head. The process then ends in step 1620.

If, instead, the phase value is negative, the process continues to step 1622 and the LALOE subtracts the interpolation position data from the positional value, which results in the absolute position of the read-head. The process then ends again in step 1620.

Persons skilled in the art will understand and appreciate, that one or more processes, sub-processes, or process steps described may be performed by hardware and/or software. Additionally, the controller may be implemented completely in software that would be executed within a microprocessor, general purpose processor, combination of processors, digital signal processor ("DSP"), and/or application specific integrated circuit ("ASIC"). If the process is performed by software, the software may reside in software memory in the controller. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

It will be understood that the foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed:

1. A Low-Cost Absolute Linear Optical Encoder ("LALOE") for determining the absolute position of a read-head within the LALOE relative to a codestrip, the LALOE comprising:
   an emitter module within the read-head, the emitter module having a plurality of light sources ranged in a light source pattern and an intensity reference light source; and
   a detector module within the read-head, the detector module having a plurality of photo-detectors arranged in a photo-detector pattern corresponding to the light source pattern and an intensity reference photo-detector corresponding to the intensity reference light source, wherein the detector module is configured to receive optical radiation from the emitter module.

2. The LALOE of claim 1, further including an analog-to-digital converter ("ADC") in signal communication with the detector module, wherein the ADC creates a digital output corresponding to the received optical radiation at the detector module.

3. The LALOE of claim 2, further including a controller in signal communication with the detector module, wherein the controller interpolates the absolute position of the read-head relative to the codestrip.

4. The LALOE of claim 3, wherein the plurality of light sources includes a plurality of light emitting diodes ("LEDs").

5. The LALOE of claim 4, wherein the plurality of photo-detectors includes a plurality of photo-diodes.

6. The LALOE of claim 5, wherein the emitter module further includes a 90° Out-Of-Phase light source and the detector module further includes a 90° Out-Of-Phase photo-detector corresponding to the 90° Out-Of-Phase light source.

7. The LALOE of claim 6, wherein the 90° Out-Of-Phase light source is spaced a quarter wavelength from the light source pattern, and the 90° Out-Of-Phase photo-detector is spaced a quarter wavelength from the photo-detector pattern.

8. The LALOE of claim 7, further including an analog-to-digital converter ("ADC") in signal communication with the detector module, wherein the ADC creates a digital output corresponding to the received optical radiation at the detector module.

9. The LALOE of claim 8, further including a controller in signal communication with the detector module, wherein the controller interpolates the absolute position of the read-head relative to the codestrip.

10. The LALOE of claim 9, wherein the plurality of light sources includes a plurality of light emitting diodes ("LEDs").

11. The LALOE of claim 10, wherein the plurality of photo-detectors includes a plurality of photo-diodes.

12. The LALOE of claim 1, wherein the code strip includes a positioning pattern and an intensity reference pattern, the positioning pattern including a plurality of clear positioning elements and dark positioning elements, and the intensity reference pattern including a plurality of clear reference elements.

13. The LALOE of claim 12, wherein the positioning pattern is defined by a plurality of positional sub-patterns, and each reference element is aligned with a corresponding positional sub-pattern along a reference axis.

14. The LALOE of claim 1, wherein the code strip includes a positioning pattern, an intensity reference pattern, and a 90° Out-Of-Phase pattern, the positioning pattern including a plurality of clear positioning elements and dark positioning elements, the intensity reference pattern including a plurality of clear reference elements, and the 90° Out-Of-Phase pattern including a plurality of clear 90° Out-Of-Phase elements.

15. A method for determining the absolute position of a read-head in a Low-Cost Absolute Linear Optical Encoder ("LALOE") relative to a codestrip, the method comprising:
   transmitting optical radiation from a plurality of light sources within an emitter module in the read-head to a detector module in the read-head through the codestrip;
   receiving the transmitted optical radiation through the codestrip at a plurality of photo-detectors within the detector module, wherein the plurality of photo-detectors are arranged as a sub-plurality of photo-detectors corresponding to a photo-detector pattern, an intensity reference photo-detector, and a 90° Out-Of-Phase photo-detector; and determining the absolute position of the read-head.

16. The method of claim 15, wherein determining the absolute position includes:

determining a gross absolute position of the read-head from the received optical radiation intensity at the photo-detector pattern;

measuring the received optical radiation intensity at the intensity reference photo-detector;

digitizing the measured received optical radiation intensity with an analog-to-digital converter ("ADC") to provide interpolation position data that represents a plurality of interpolated positions within the gross absolute position; and determining the absolute position of the read-head from the gross absolute position and the interpolated position data.

17. The method of claim 16, wherein determining the absolute position includes assigning a positional value to a positional pattern on the codestrip, wherein the positional value corresponds to the gross absolute position of the read-head; and determining a phase value for the received optical radiation at the 90° Out-Of-Phase photo-detector, wherein the phase value corresponds to the difference between the received optical radiation intensity at the intensity reference photo-detector and the received optical radiation intensity at the photo-detector pattern.

18. The method of claim 17, wherein determining the absolute position further includes adding the interpolation position data to the positional value resulting in the absolute position of the read-head when the phase value is a positive value.

19. The method of claim 17, wherein determining the absolute position further includes subtracting the interpolation position data from the positional value resulting in the absolute position of the read-head when the phase value is a negative value.

20. A method for determining the absolute position of a read-head in a Low-Cost Absolute Linear Optical Encoder ("LALOE") relative to a codestrip, the method comprising:

transmitting optical radiation from a plurality of light sources within an emitter module in the read-head to a detector module in the read-head through the codestrip;

receiving the transmitted optical radiation through the codestrip at a plurality of photo-detectors within the detector module, wherein the plurality of photo-detectors are arranged as a sub-plurality of photo-detectors corresponding to a photo-detector pattern and an intensity reference photo-detector; and determining the absolute position of the read-head.

21. The method of claim 20, wherein determining the absolute position includes:

measuring the received optical radiation intensity at the photo-detector pattern;

assigning a positional value to a positional pattern on the codestrip, wherein the positional value corresponds to the gross absolute position of the read-head;

digitizing the measured received optical radiation intensity at the photo-detector pattern with an analog-to-digital converter ("ADC") to provide interpolation position data that represents a plurality of interpolated positions within the gross absolute position;

determining a phase value for optical radiation recieved at a 90° Out-Of-Phase photo-detector of the detector module, wherein the phase value corresponds to the difference between the received optical radiation intensity at the photo-detector pattern and the received optical radiation intensity at the photo-detector pattern; and determining the absolute position of the read-head from the gross absolute position, the interpolated position data, and the phase value.

* * * * *

UNITED STATES PATENT AND TRADEMARK OFFICE
CERTIFICATE OF CORRECTION

PATENT NO. : 7,180,430 B2 Page 1 of 1
APPLICATION NO. : 10/979280
DATED : February 20, 2007
INVENTOR(S) : Kean Ng It is certified that error appears in the above-identified patent and that said Letters Patent is hereby corrected as shown below:

Col. 11, line 60;
In Claim 1, delete "ranged" and
insert -- arranged --, therefor.

Col. 13, line 21;
In Claim 17, after "includes"
insert -- : --.

Col. 14, line 26;
In Claim 21, delete "recieved" and
insert -- received --, therefor.

Signed and Sealed this

Twenty-ninth Day of July, 2008

JON W. DUDAS
*Director of the United States Patent and Trademark Office*